US008248227B2

(12) United States Patent
Sheleheda et al.

(10) Patent No.: US 8,248,227 B2
(45) **Date of Patent: *Aug. 21, 2012**

(54) METHOD AND APPARATUS FOR SUPPRESSING DUPLICATE ALARMS

(75) Inventors: Daniel Sheleheda, Florham Park, NJ (US); Michael Singer, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1064 days.

This patent is subject to a terminal disclaimer.

(21) Appl. No.: 12/177,687

(22) Filed: Jul. 22, 2008

(65) Prior Publication Data

US 2008/0284581 A1 Nov. 20, 2008

Related U.S. Application Data

(63) Continuation of application No. 11/323,288, filed on Dec. 29, 2005, now Pat. No. 7,408,458.

(51) Int. Cl.

*G08B 29/00* (2006.01)
*G08B 25/00* (2006.01)
*G06F 7/00* (2006.01)

(52) U.S. Cl. .......... 340/506; 340/507; 340/525; 700/17; 700/19; 702/185; 702/191

(58) Field of Classification Search .................. 340/506
See application file for complete search history.

(56) References Cited

U.S. PATENT DOCUMENTS

| | | | |
|---|---|---|---|
| 6,356,282 | B2 | 3/2002 | Roytman et al. |
| 6,513,129 | B1 | 1/2003 | Tentij et al. |
| 6,748,432 | B1 | 6/2004 | Du et al. |
| 6,963,983 | B2 | 11/2005 | Munson et al. |
| 7,370,357 | B2 | 5/2008 | Sekar |
| 7,408,458 | B1 | 8/2008 | Sheleheda et al. |
| 7,631,058 | B2 | 12/2009 | Grabarnik et al. |
| 2004/0117658 | A1 | 6/2004 | Klaes |
| 2005/0060562 | A1 | 3/2005 | Bhattacharya et al. |
| 2006/0123479 | A1 | 6/2006 | Kumar et al. |
| 2007/0143851 | A1 | 6/2007 | Nicodemus et al. |

*Primary Examiner* — Donnie Crosland

(57) ABSTRACT

A method and apparatus for suppressing a duplicated alarm in a communications network are described. In one embodiment, at least one alarm message associated with at least one event is received. A determination of whether the at least one event exists in a database is subsequently made. The at least one event is recorded in the database if the at least one event does not exist in the database. Conversely, the at least one alarm message is suppressed if the at least one event exists in the database.

20 Claims, 3 Drawing Sheets

100
CMC
116
GC
ADM
DB
118
119
114
EC
EC
EC
106 1
106 2
106 P
PARSER
104 1
104 2
104 M
DEVICE
DEVICE
DEVICE
102 1
102 2
102N

200
START
202
RECEIVE ALARMS
204
IS EVENT IN DATABASE ?
206
YES
IGNORE RECEIVED ALARM
212
NO
208
UPDATE HASH TABLE WITH ENTRY
210
DISPLAY ALARM ON PORTAL
214
END

METHOD AND APPARATUS FOR SUPPRESSING DUPLICATE ALARMS

CROSS REFERENCE TO RELATED APPLICATIONS

This application is a continuation of U.S. patent application Ser. No. 11/323,288 filed Dec. 29, 2005, now U.S. Pat. No. 7,408,458 B1, which is incorporated herein by reference in its entirety.

BACKGROUND OF THE INVENTION

1. Field of the Invention

Embodiments of the present invention generally relate to anomaly detection systems and, more particularly, to a method and apparatus for suppressing duplicate alarms in a communications network, such as an enterprise environment.

2. Description of the Related Art

Presently, the volume of detected security events within an enterprise environment network can produce an overwhelming quantity of alarms. However, a significant portion of these alarms are recurring duplicates. Therefore, these duplicate alarm messages need to be intelligently suppressed from being processed and/or displayed at a central management console. Failure to do so may create a denial of service condition against a cyber security team, or alternatively overwhelm a network operator viewing a monitoring display. For example, during the outbreak of a cyber security event such as a virus or worm, the number of alarms may be excessive and can overwhelm a cyber security team. Similarly, many commercial system vendors often provide scrolling windows to receive and view the flow of alarm messages. Some vendors provide “freeze” and “continue” buttons to halt the scrolling alarms so they can be examined. However, these solutions are not completely effective because the duplicated alarms make it difficult for other alarm messages to be discerned.

Thus, there is a need in the art for a method and apparatus for suppressing duplicate alarms.

SUMMARY OF THE INVENTION

In one embodiment, a method and apparatus for suppressing a duplicated alarm in a communications network are described. Specifically, at least one alarm message associated with at least one event is received. A determination of whether the at least one event exists in a database (or in a memory state table) is subsequently made. The at least one event is recorded in the database if the at least one event does not exist in the database. Conversely, the at least one alarm message is suppressed if the at least one event exists in the database.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
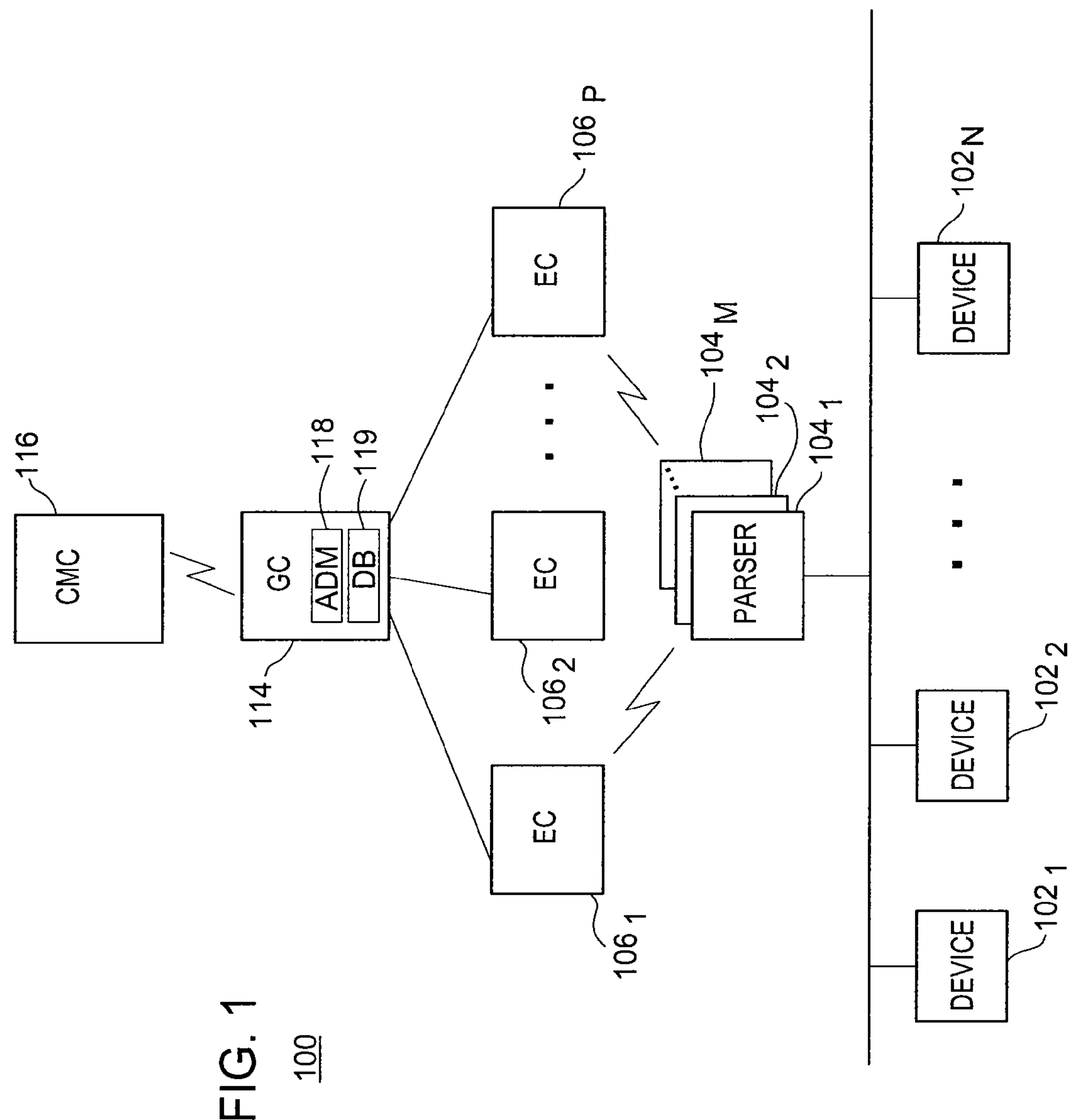
FIG. 1 is a block diagram depicting an exemplary embodiment of a communication system in accordance with the invention.

To better understand the present invention, FIG. 1 illustrates a communication architecture comprising an exemplary communications network system 100, such as a security information management (SIM) enterprise environment, related to the present invention. Broadly defined, a SIM enterprise environment includes a network that is configured to automatically collect event log data from a plurality of security and network devices, such as firewalls, proxies, intrusion detection systems (IDSs), routers, and the like. The event log data is processed using data aggregation, standardization, and event correlation mechanisms in a manner that normalizes the information collected from the different security and network devices. The event data is subsequently further processed and ultimately provided to a central management console (CMC) 116 to be utilized by the network operator. The present invention should not be interpreted as being limited by the architecture depicted in FIG. 1.

In one embodiment, the SIM environment 100 comprises a customer network layer that comprises a plurality of devices $\mathbf{102}_{1 \ldots n}$ that are configured for collecting log information. In one embodiment, the log information is made up of log files that record the transactions (e.g., requests, scans, inquiries, and other access actions made by other computers) involving the collection devices $\mathbf{102}_{1 \ldots n}$. Specifically, these devices $\mathbf{102}_{1 \ldots n}$ may comprise network devices or security devices such as honeypots, tarpits, routers, proxies, IDSs, firewalls, e-mail servers, and the like. The log information produced by the devices $\mathbf{102}_{1 \ldots n}$ is ultimately acquired by a collection of parsers $\mathbf{104}_{1 \ldots m}$. The parsers 104, which may be located in at least one network server, are responsible for standardizing the log information collected from the network and security devices $\mathbf{102}_{1 \ldots n}$. Specifically, the log information generated by the different devices may vary in form. The parsers 104 are able to process the different types of log information and convert all of the data into a homogenous and standard form.

The first “correlation” layer of the SIM system 100 comprises of a plurality of event consolidators (ECs) $\mathbf{106}_{1 \ldots p}$. The ECs 106 receive the standardized log information from the parsers 104 and initially perform normalization procedures. The normalization procedures may include timing normalization, classification normalization (i.e., assigning common names to common types of log information), and the like. Afterwards, the ECs conduct brief, near real-time alarming measures. The ECs $\mathbf{106}_{1 \ldots p}$ are initially provisioned with a set of security event detection rules that use state tables to “remember” instances of activities that can be used to detect suspicious or anomalous activity over a short period of time (e.g., a computer that accesses 100 IP ports on 100 different computers in a span of 5 minutes). An EC is limited to the number of objects (e.g., 15,000 objects) that can be held in a state table. Upon detecting an abnormal activity using the security event detection rules, an EC 106 will generate an alarm message that is provided to a global correlator 114. In one embodiment, each of the ECs is designated to service a particular geographical region.

The global correlator (GC) 114 is a network element that is responsible for receiving the alarms from the “regional” ECs $\mathbf{106}_{1 \ldots p}$. Notably, the GC 114 is still limited to a predefined number of objects (e.g., 15,000 objects) in a state table as well as conducting near real-time alarming over a short period of time (e.g., inspecting log information for suspicious activity in 30 second intervals). The GC 114 is also configured to consolidate and correlate all of the received alarms and provide them to a central management console (CMC) 116. The CMC 116 may comprise a cyber command console or portal that enables a network operator to view and analyze incoming alarms.

In one embodiment of the present invention, the global correlator (GC) 114 contains an alarm de-duplication module 118. The alarm de-duplication module (ADM) 118 is configured to perform an alarm suppression process to reduce the number of redundant alarms forwarded to the CMC 116. Specifically, the ADM 118 evaluates each alarm message being sent to the CMC 116 (via the GC 114) to determine whether the alarm message is new or if it is a duplicate of a previously sent message. An alarm message may be considered duplicate if an event is identical to another event with respect to similar attributes. For example, if the event is characterized by the same alarm name, source IP (SIP) address, the same destination IP (DIP) address, the same source port, the same destination port, and the same protocol, then the event is considered a duplicate by the ADM 118. Notably, the attributes of an identical event are configurable (i.e., a duplicate event may be defined by more or less predefined attributes) by a network operator. Other attributes that may be used to define an event include, but are not limited to, bytes per packet ration (BPR), icmp type, code type, source hostname, TCP flag, and the like.

In one embodiment, the ADM 118 performs the alarm suppression process by using state based rules. The rules are used to create a state based hash table (in a local database 119) based on certain attributes or keys. Notably, a network operator may configure the ADM 118 to consider any number of predefined attributes. The attributes are used to identify the keys that define a duplicate event. These keys need to be unique enough to specify only the events of interest without suppressing other alarms that are not considered duplicates. The attributes that are selected as the unique identification keys are entered into the rules system by the operator.

Upon receiving an alarm from the ECs $\mathbf{106}_{1 \ldots p}$, the ADM 118 inspects the associated event and attempts to place the event into a hash table. Specifically, when an alarm message is received, the hash table is examined to determine if an event with the same hash keys is present. If there is an identical entry already in this state based hash table, the event is not forwarded up to the management console at the CMC 116. If there is not an entry in the state based hash table, the hash table is updated with this new event and the associated alarm is forwarded to the CMC 116. The hash is maintained on a temporal basis that is configurable by a network operator. Items in the hash table that have exceeded a predefined retention period (which is configurable by a network operator) are removed.

For example, the hash table may be configured to maintain entries for up to 24 hours. Upon placing a new entry into the hash table, the ADM 118 dates and time stamps the entry. Any similar alarm received (and compared to the hash table) by the GC 114 during the predefined 24 hour period following the time stamp is suppressed and not forwarded to the CMC 116. Therefore, the network operator (e.g., a system analyst) that is responsible for monitoring alarms at the CMC 116 is not presented with the redundant alarm. After the 24 hour period has lapsed, the expired entry is removed from the hash table. Any similar alarm (to the recently deleted entry) that is subsequently received at the GC 114 is recorded in the hash table and is ultimately forwarded to the CMC 116. This effectively notifies the network operator that the problem generating the alarms has yet to be resolved.

Figure 2:
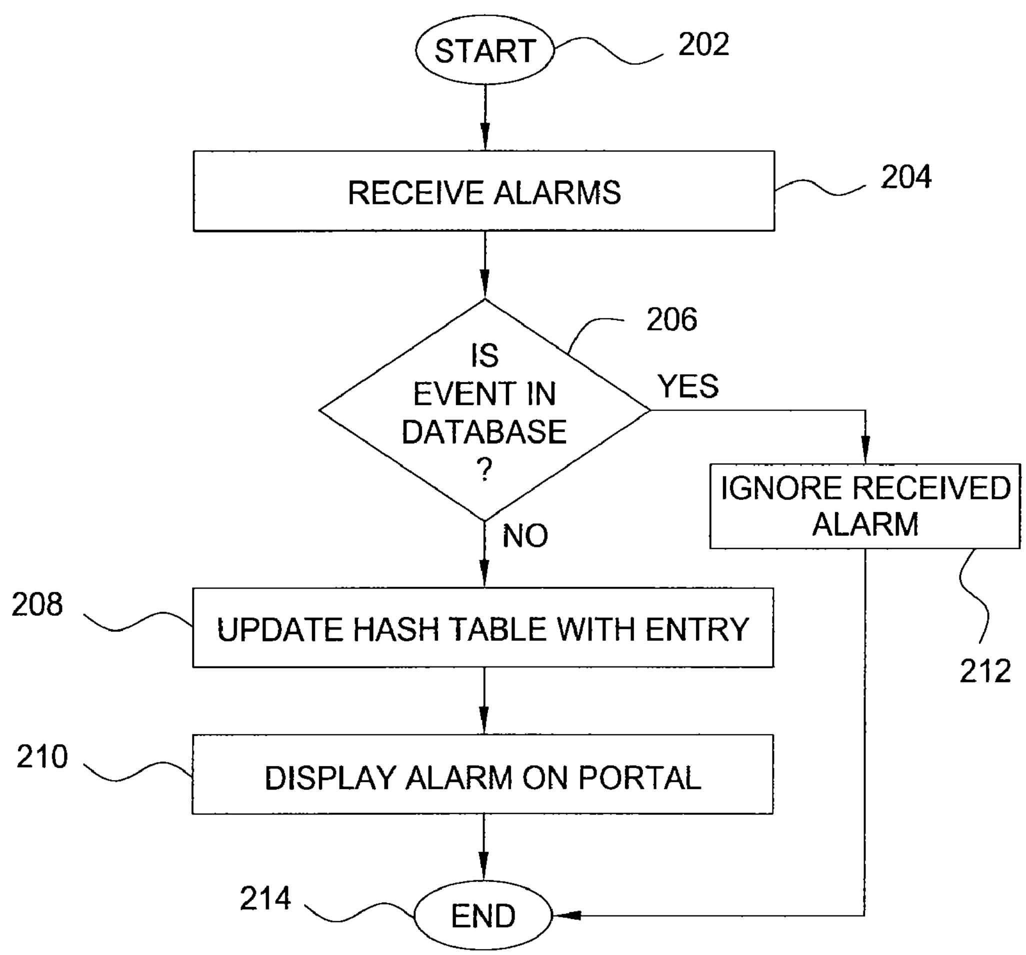
FIG. 2 is a flow diagram depicting an exemplary embodiment of a method for suppressing duplicate alarms in accordance with one or more aspects of the invention.

FIG. 2 is a flow diagram depicting an exemplary embodiment of a method 200 for suppressing duplicate alarms as related to one or more aspects of the invention. The method 200 begins at step 202 and proceeds to step 204 where alarm messages are received. In one embodiment, the global correlator (GC) 114 receives a plurality of alarm messages from a plurality event correlators $\mathbf{106}_{1 \ldots p}$.

At step 206, a determination of whether an event associated with a received alarm message resides as an entry in a local database 119 is made. In one embodiment, the GC 114 compares each event associated with a received alarm message (from step 204) entries in a hash table. If the event is found to already exist as an entry in the hash table, the method 200 proceeds to step 212 where the received alarm message is suppressed (e.g., ignored). If the event is not found to exist in the hash table, then the method 200 continues to step 208.

At step 208, the database is updated with the event entry. In one embodiment, the GC 114 stores the new event associates with the received alarm message in the appropriate entry of the hash table. The alarm message's time of receipt (e.g., date and time stamp) is also stored with the event entry.

At step 210, the alarm message is displayed on a portal. In one embodiment, a single instance of a duplicated alarm message (i.e., the alarm message associated with the event entry stored in the database) is provided to and displayed on a network operator's display screen. By limiting the number of alarm messages that can be displayed, the user at the CMC 116 is less likely to be overwhelmed. The method 200 ends at step 214.

Figure 3:
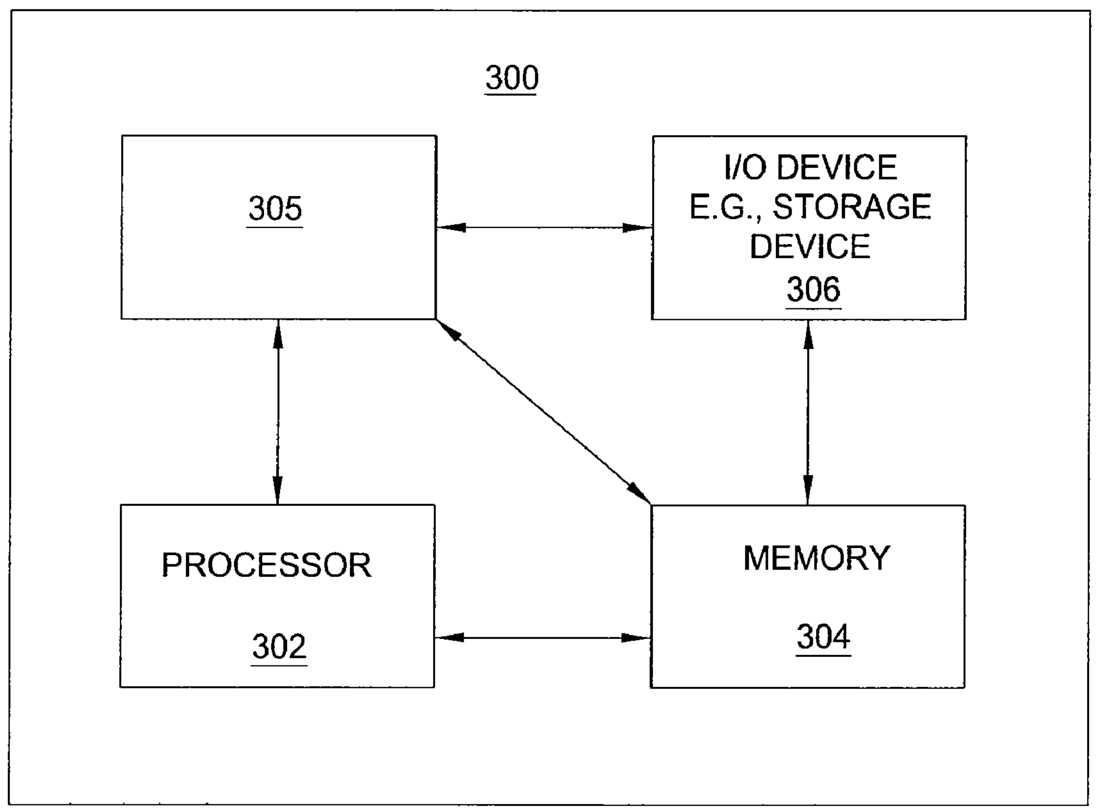
FIG. 3 is a block diagram depicting an exemplary embodiment of a computer suitable for implementing the processes and methods described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for suppressing duplicate alarms, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 305 for suppressing duplicate alarms can be loaded into memory 304 and executed by processor 302 to implement the functions as discussed above. As such, the present process 305 for suppressing duplicate alarms (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for processing an alarm message in a communications network, comprising:

receiving the alarm message, wherein the alarm message is associated with an event;

determining if the event exists in a memory;

recording the event in the memory if the event does not exist in the memory; and suppressing the alarm message if the event exists in the memory.

2. The method of claim 1, wherein the memory comprises a hash table.

3. The method of claim 1, further comprising:

forwarding the alarm message to a central management console after the event is recorded in the memory.

4. The method of claim 1, wherein the event is designated as a duplicate event if a replica of the event exists in the memory.

5. The method of claim 4, wherein the duplicate event is characterized by an event name, an identical source internet protocol address, an identical destination internet protocol address, an identical source port, an identical destination port, and an identical protocol as compared to the replica.

6. The method of claim 1, further comprising:

deleting the event from the memory upon an expiration of a predefined time period.

7. The method of claim 1, wherein the communications network comprises an internet protocol network.

8. A computer readable medium having stored thereon a plurality of instructions, the plurality of instructions including instructions which, when executed by a processor, causes the processor to perform a method for processing an alarm message in a communications network, comprising:

receiving the alarm message, wherein the alarm message is associated with an event;

determining if the event exists in a memory;

recording the event in the memory if the event does not exist in the memory; and suppressing the alarm message if the event exists in the memory.

9. The computer readable medium of claim 8, wherein the memory comprises a hash table.

10. The computer readable medium of claim 8, further comprising:

forwarding the alarm message to a central management console after the event is recorded in the memory.

11. The computer readable medium of claim 8, wherein the event is designated as a duplicate event if a replica of the event exists in the memory.

12. The computer readable medium of claim 11, wherein the duplicate event is characterized by an event name, an identical source internet protocol address, an identical destination internet protocol address, an identical source port, an identical destination port, and an identical protocol as compared to the replica.

13. The computer readable medium of claim 8, further comprising:

deleting the event from the memory upon an expiration of a predefined time period.

14. The computer readable medium of claim 8, wherein the communications network comprises an Internet protocol network.

15. An apparatus for processing an alarm message in a communications network, comprising:

a processor; and a computer readable medium in communication with the processor, wherein the computer readable medium has stored thereon a plurality of instructions, the plurality of instructions including instructions which, when executed by the processor, cause the processor to perform a method, comprising:

receiving the alarm message, wherein the alarm message is associated with an event;

determining if the event exists in a memory;

recording the event in the memory if the event does not exist in the memory; and suppressing the alarm message if the event exists in the memory.

16. The apparatus of claim 15, wherein the memory comprises a hash table.

17. The apparatus of claim 15, wherein the method further comprises:

forwarding the alarm message to a central management console after the event is recorded in the memory.

18. The apparatus of claim 15, wherein the event is designated as a duplicate event if a replica of the event exists in the memory.

19. The apparatus of claim 18, wherein the duplicate event is characterized by an event name, an identical source Internet protocol address, an identical destination internet protocol address, an identical source port, an identical destination port, and an identical protocol as compared to the replica.

20. The apparatus of claim 15, wherein the method further comprises:

deleting the event from the memory upon an expiration of a predefined time period.

* * * * *